UNITED STATES PATENT OFFICE.

JOHN Q. CHASE, OF GRAND RAPIDS, MICHIGAN.

WALL-PLASTER.

SPECIFICATION forming part of Letters Patent No. 516,914, dated March 20, 1894.

Application filed May 25, 1893. Serial No. 475,512. (No specimens.)

*To all whom it may concern:*

Be it known that I, JOHN Q. CHASE, a citizen of the United States, residing at Grand Rapids, in the county of Kent and State of Michigan, have invented certain new and useful Improvements in Wall-Plaster; and I do hereby declare the following to be a full, clear, and exact description of the invention, such as will enable others skilled in the art to which it appertains to make and use the same.

My invention relates to an improved wall plaster, and its object is to produce a compound which may be used as a cement when taken alone, or as a wall plaster that is fire resisting when mixed with dry sand, and to which may be added fiber, or other tissuey substances.

My invention consists in mixing and commingling together the ingredients hereinafter set forth in substantially the proportions specified, but I do not limit myself to the exact proportions named, as it will be evident that they may be varied materially without departing from the spirit of my invention.

I first take twenty-five pounds of sulphate of lime to which are added two ounces of oil-cake meal and four ounces of lime (hydrate). This is well mixed that these ingredients may become thoroughly incorporated. I then add one dram of cream-tartar, one-half ounce of carbonate of soda and one ounce each of oxide of lead and dextrine; when these ingredients are thoroughly mixed, I have a very efficient fire resisting cement, from which wall plaster may be made by adding dry sand and water, making it light and elastic by adding a fiber, or other like substance, such as jute, asbestus, or other ground fibrous vegetable, or mineral matter. I find that oil-cake meal has a tendency to make the plaster impervious, it also toughens and unites the mass. Dextrine increases the hardness and adhesion. Oxide of lead readily unites with the oil-cake meal increasing the cementing as well as fire resisting properties. Soda and cream tartar give off carbonic acid gas, which lightens the material, making it more plastic and easier to work.

It is evident that other substances may be used instead of some of those named. I therefore do not limit myself to the exact ingredients, and more especially as to the dextrine, which may be displaced by various gums, sugar, sirup, starch, glucose, or other like viscous substances, so also for the cream tartar and soda, may be substituted other substances having acid and alkaline reactions whereby when mixed a chemical decomposition is effected to liberate a gas, to lighten the mass by making it spongy, or porous.

Having described my invention, what I claim, and desire to secure by Letters Patent, is—

The herein described composition of matter consisting of lime, plaster of paris, oil-cake meal, oxide of lead, dextrine, carbonate of soda and cream tartar, substantially as described.

In testimony whereof I affix my signature in presence of two witnesses.

JOHN Q. CHASE.

Witnesses:
LUTHER V. MOULTON,
LEWIS E. FLANDERS.